US010921848B2

(12) United States Patent
Swamy

(10) Patent No.: US 10,921,848 B2
(45) Date of Patent: Feb. 16, 2021

(54) CLOCK SIGNAL DISTRIBUTION AND SIGNAL VALUE STORAGE

(71) Applicant: ARM Limited, Cambridge (GB)

(72) Inventor: Ramnath Bommu Subbiah Swamy, Sheffield (GB)

(73) Assignee: ARM Limited, Cambridge (GB)

( * ) Notice: Subject to any disclaimer, the term of this patent is extended or adjusted under 35 U.S.C. 154(b) by 393 days.

(21) Appl. No.: 15/735,362

(22) PCT Filed: Jun. 23, 2016

(86) PCT No.: PCT/GB2016/051867
§ 371 (c)(1),
(2) Date: Dec. 11, 2017

(87) PCT Pub. No.: WO2017/009599
PCT Pub. Date: Jan. 19, 2017

(65) Prior Publication Data
US 2018/0173271 A1    Jun. 21, 2018

(30) Foreign Application Priority Data

Jul. 14, 2015 (GB) .................................. 1512285.6

(51) Int. Cl.
*G06F 1/10* (2006.01)
*G06F 1/12* (2006.01)
*G06F 1/06* (2006.01)

(52) U.S. Cl.
CPC ................. *G06F 1/10* (2013.01); *G06F 1/06* (2013.01); *G06F 1/12* (2013.01)

(58) Field of Classification Search
CPC ..... G06F 1/14; G06F 1/10; G06F 1/12; G06F 1/08
See application file for complete search history.

(56) References Cited

U.S. PATENT DOCUMENTS

| 6,539,509 B1* | 3/2003 | Teene | G01R 31/31725 |
| | | | 714/727 |
| 2002/0014898 A1* | 2/2002 | Ikeda | H03K 19/1735 |
| | | | 326/101 |

(Continued)

FOREIGN PATENT DOCUMENTS

JP    H08-204135    8/1996

OTHER PUBLICATIONS

International Search Report and Written Opinion of the ISA for PCT/GB2016/051867, dated Nov. 22, 2016, 18 pages.

(Continued)

*Primary Examiner* — Phil K Nguyen
(74) *Attorney, Agent, or Firm* — Nixon & Vanderhye, P.C.

(57) ABSTRACT

An integrated circuit includes multiple blocks of circuitry (4, 6, 8) communicating signals via an interface 10 controlled by a clock signal. A clock mesh (20, 22) is used on at least one side of the interface driven by one or more clock drivers (24, 26) that drive the clock mesh with the clock signal communicated with a further block of circuitry. A plurality of interface storage circuits (flip-flops) (12, 14, 16, 18) are coupled to the clock mesh and receive the clock signal from the clock mesh to control storage therein. The interface storage circuits (54) may be of a form controlled by multiple clock signals, CP0, CP1. A signal value D may be captured into the storage circuit upon a rising edge of a first clock signal CP0 and launched from the storage circuit upon the rising edge of a second clock signal CP1.

13 Claims, 15 Drawing Sheets

(56) References Cited

U.S. PATENT DOCUMENTS

| | | | |
|---|---|---|---|
| 2003/0030472 A1* | 2/2003 | Takata | H03K 5/1506 327/141 |
| 2005/0083087 A1 | 4/2005 | Dement et al. | |
| 2007/0038430 A1* | 2/2007 | Walker | G06F 30/33 703/14 |
| 2008/0115004 A1 | 5/2008 | Braun et al. | |
| 2008/0256380 A1* | 10/2008 | Tsutsumi | G06F 1/10 713/500 |
| 2008/0284483 A1* | 11/2008 | Nakashima | G06F 1/10 327/293 |
| 2011/0057710 A1* | 3/2011 | Terayama | G06F 1/10 327/365 |
| 2014/0145347 A1* | 5/2014 | Samadi | H03K 19/0008 257/774 |
| 2014/0176215 A1* | 6/2014 | Ahmed | G06F 1/10 327/269 |
| 2015/0168992 A1* | 6/2015 | Choi | H03K 19/01750 327/108 |
| 2015/0310153 A1* | 10/2015 | Taskin | G06F 30/367 716/114 |
| 2015/0323959 A1* | 11/2015 | Arabi | H03L 7/0812 327/270 |
| 2015/0378388 A1* | 12/2015 | Franch | G06F 1/08 327/293 |
| 2016/0140280 A1* | 5/2016 | Arp | G06F 30/392 716/108 |

OTHER PUBLICATIONS

Combined Search and Examination Report for GB 1512285.6, dated Feb. 4, 2016, 7 pages.
Ferrara et al. "Optimizing Clock Tree Distribution in SoCs with Multiple Clock Sinks", Mar. 2013, 5 pages.
Bailey et al. "Clocking Design and Analysis for a 600-MHz Alpha Microprocessor", IEEE Journal of Solid-State Circuits, IEEE Service Center, vol. 33, No. 11, Nov. 1, 1998, pp. 1627-1633.
Verma et al. "Understanding Clock Domain Crossing Issue ", EE Times, Dec. 24, 2007, 15 pages.
UK Examination Report dated Dec. 21, 2017 in GB 1512285.6, 3 pages.

* cited by examiner

CLOCK SIGNAL DISTRIBUTION AND SIGNAL VALUE STORAGE

This application is the U.S. national phase of International Application No. PCT/GB2016/051867 filed Jun. 23, 2016, which designated the U.S. and claims priority to GB Patent Application No. 1512285.6 filed Jul. 14, 2015, the entire contents of each of which are hereby incorporated by reference.

This disclosure relates to the field of data processing circuitry. More particularly, this disclosure relates to the distribution of a clock signal within data processing circuitry.

It is known to provide integrated circuits which utilise a clock tree network to distribute a clock signal to different portions of the integrated circuit in order to control the operation of the integrated circuit. As clock speeds become higher, and the number of components and complexity of integrated circuits becomes higher, it becomes increasingly difficult to ensure that the clock signal distributed does not suffer from significant phase differences at different portions within the integrated circuit. This problem may be made worse by the design approach of replicating a functional block within an integrated circuit, e.g. multiple cores within the same integrated circuit, multiple caches within the same integrated circuit, etc. Adjustments to the clock tree distribution within these blocks which may be appropriate in one instantiation of the functional block may be inappropriate in another instantiation of that functional block elsewhere on the integrated circuit. This impedes the efficient reuse of the design of a functional block multiple times within an integrated circuit.

At least some embodiments of the present disclosure provide a block of circuitry comprising:

a clock mesh to distribute a clock signal communicated with a further block of circuitry;
one or more clock drivers to drive said clock mesh with said clock signal; and
a plurality of interface storage circuits to store respective interface signals communicated with said further block of circuitry; wherein
said plurality of interface storage circuits are coupled to said clock mesh to receive said clock signal from said clock mesh to control storage of said respective interface signals by said plurality of interface storage circuits using said clock signal.

At least some embodiments of the present disclosure provide a block of circuitry comprising:

clock mesh means for distributing a clock signal communicated with a further block of circuitry;
one or more clock driver means for driving said clock mesh means with said clock signal; and
a plurality of interface storage means for storing respective interface signals communicated with said further block of circuitry; wherein
said plurality of interface storage means are coupled to said clock mesh means to receive said clock signal from said clock mesh means to control storage of said respective interface signals by said plurality of interface storage means using said clock signal.

At least some embodiments of the present disclosure provide a method of operating a block of circuitry comprising the steps:

distributing with a clock mesh a clock signal communicated with a further block of circuitry;
driving with one or more clock drivers said clock mesh with said clock signal; and
storing with a plurality of interface storage circuits respective interface signals communicated with said further block of circuitry; wherein
said plurality of interface storage circuits are coupled to said clock mesh, receive said clock signal from said clock mesh means, and control storage of said respective interface signals using said clock signal.

At least some embodiments of the present disclosure provide a signal value storage circuit comprising:

a signal input to receive an input signal;
a signal output to supply an output signal;
a first clock signal input to receive a first clock signal;
a second clock signal input to receive a second clock signal different from said first clock signal;
processing circuitry to capture and to store a stored data value dependent upon said input signal in response to detecting a predetermined characteristic of said first clock signal and to generate said output signal dependent upon said stored data value in response to detecting a predetermined characteristic of said second clock signal; wherein
said processing circuitry comprises:
data value storage circuitry to store said stored data value; and
selection value storage circuitry to store a selection value to control said processing circuitry to switch between a first state responsive to said predetermined state in said first clock signal and a second state responsive to said predetermined state in said second clock signal.

At least some embodiments of the present disclosure provide a signal value storage circuit comprising:

signal input means for receiving an input signal;
signal output means for supplying an output signal;
first clock signal input means for receiving a first clock signal;
second clock signal input means for receiving a second clock signal different from said first clock signal;
processing means for capturing and for storing a stored data value dependent upon said input signal in response to detecting a predetermined characteristic of said first clock signal and for generating said output signal dependent upon said stored data value in response to detecting a predetermined characteristic of said second clock signal; wherein
said processing means comprises:
data value storage means for storing said stored data value; and
selection value storage means for storing a selection value to control said processing means to switch between a first state responsive to said predetermined state in said first clock signal and a second state responsive to said predetermined state in said second clock signal.

At least some embodiments of the present disclosure provide a method of operating a signal value storage circuit comprising the steps of:

receiving an input signal;
supplying an output signal;
receiving a first clock signal;
receiving a second clock signal different from said first clock signal;
capturing and storing a stored data value dependent upon said input signal in response to detecting a predetermined characteristic of said first clock signal and for generating said output signal dependent upon said stored data value in response to detecting a predetermined characteristic of said second clock signal; wherein
said capturing, storing and generating are preformed by processing circuitry and comprise:

storing said stored data value within data value storage circuitry; and storing a selection value within selection value storage circuitry to control said processing circuitry to switch between a first state responsive to said predetermined state in said first clock signal and a second state responsive to said predetermined state in said second clock signal.

Example embodiments will now be described, by way of example only, with reference to the accompanying drawings in which:

FIG. 1A schematically illustrates an integrated circuit including multiple instances of a processor core connected via interconnect circuitry and including a clock signal which is distributed through the processor cores and the interconnect circuitry;

FIG. 1B schematically illustrates how clock signal differences can arise through a clock tree;

Figure 4:
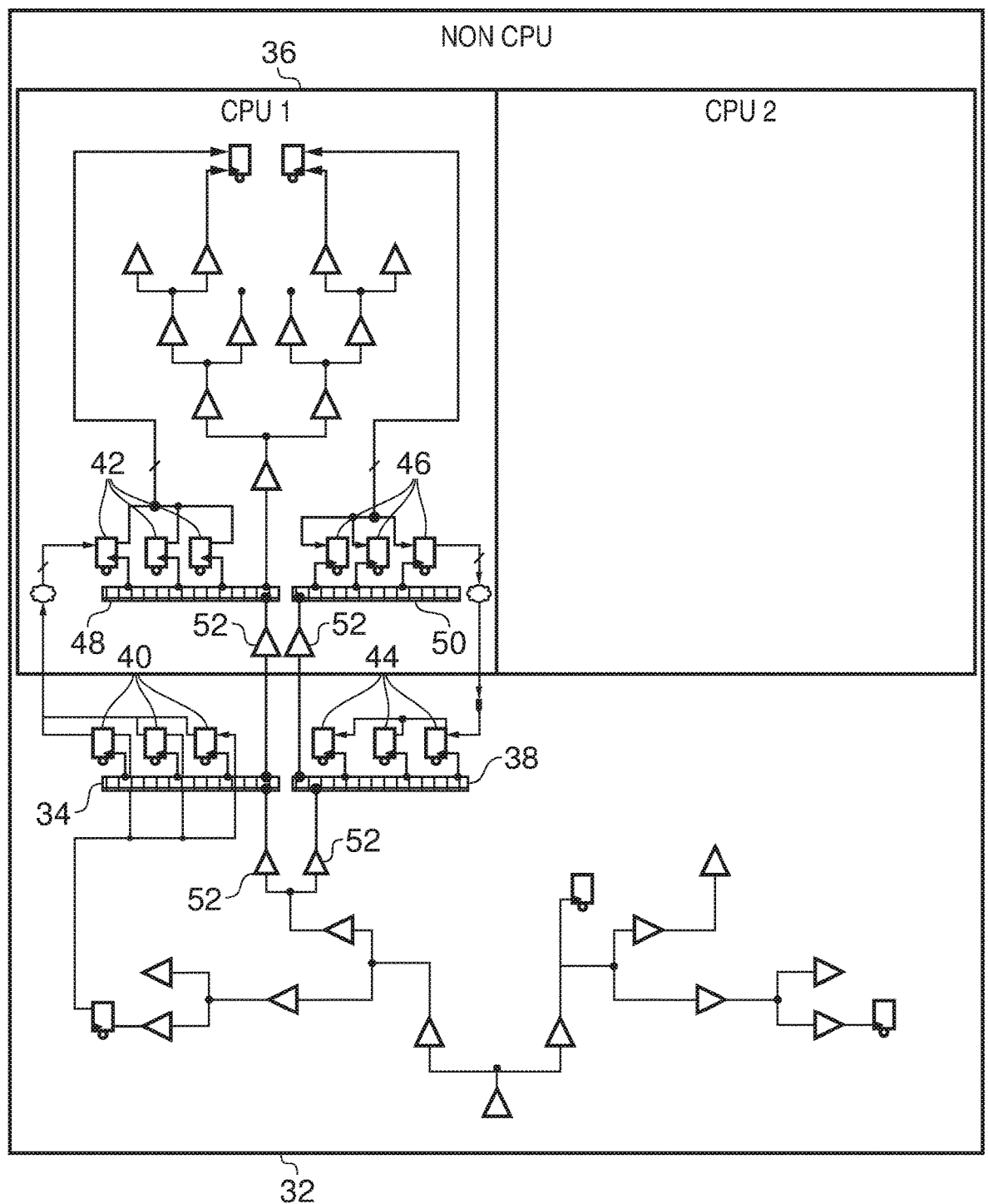
Figure 5:
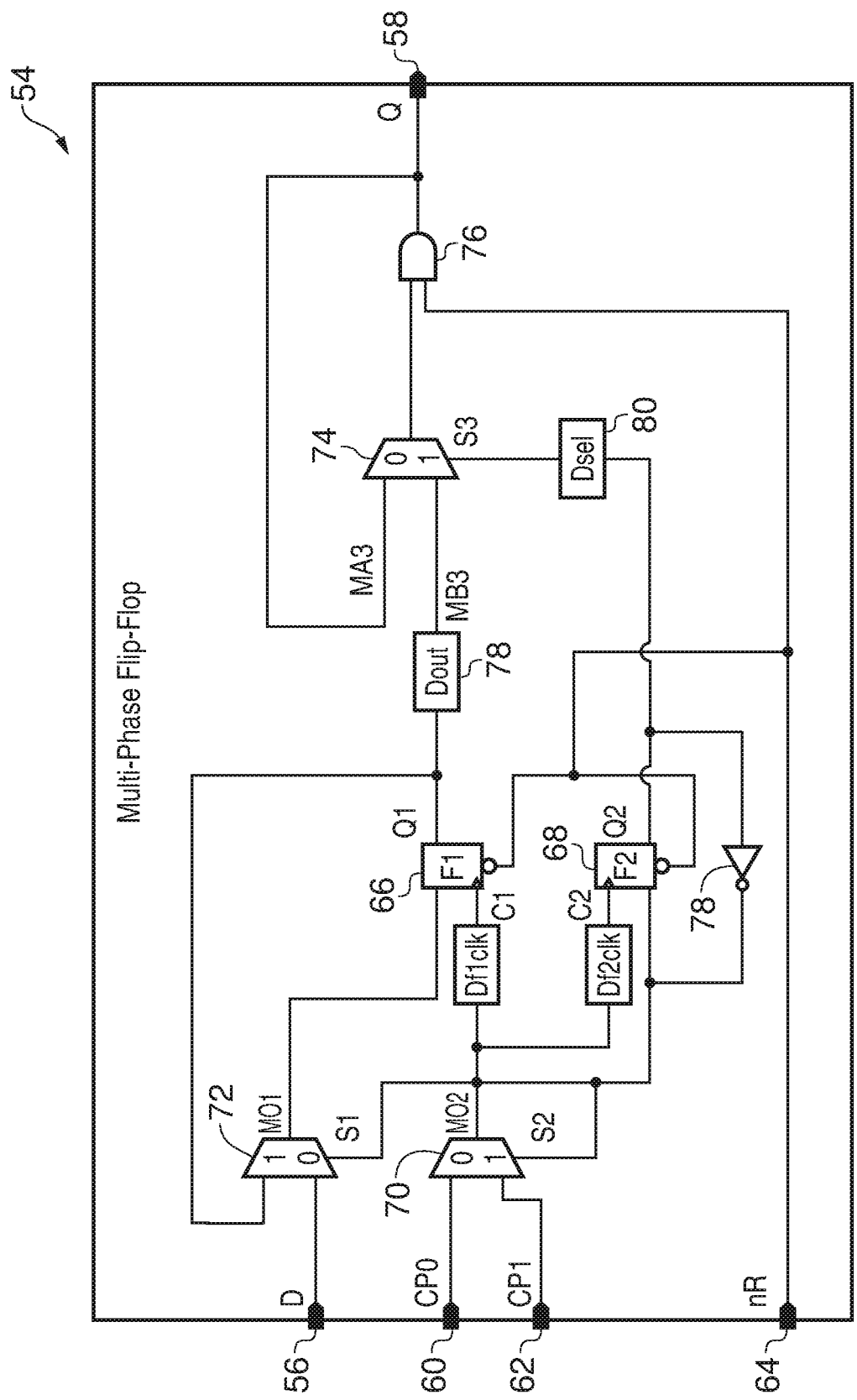
Figure 6:
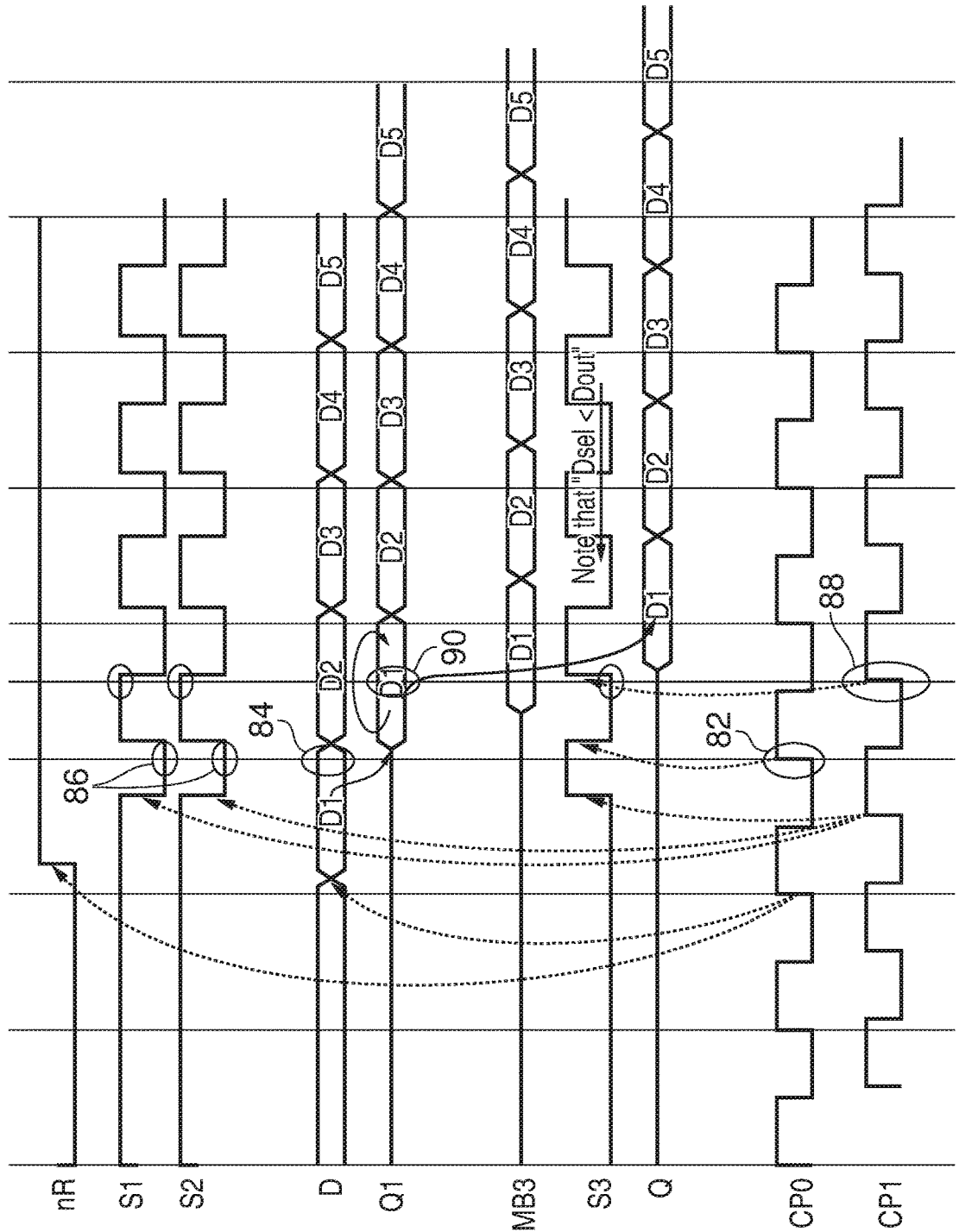
Figure 7:
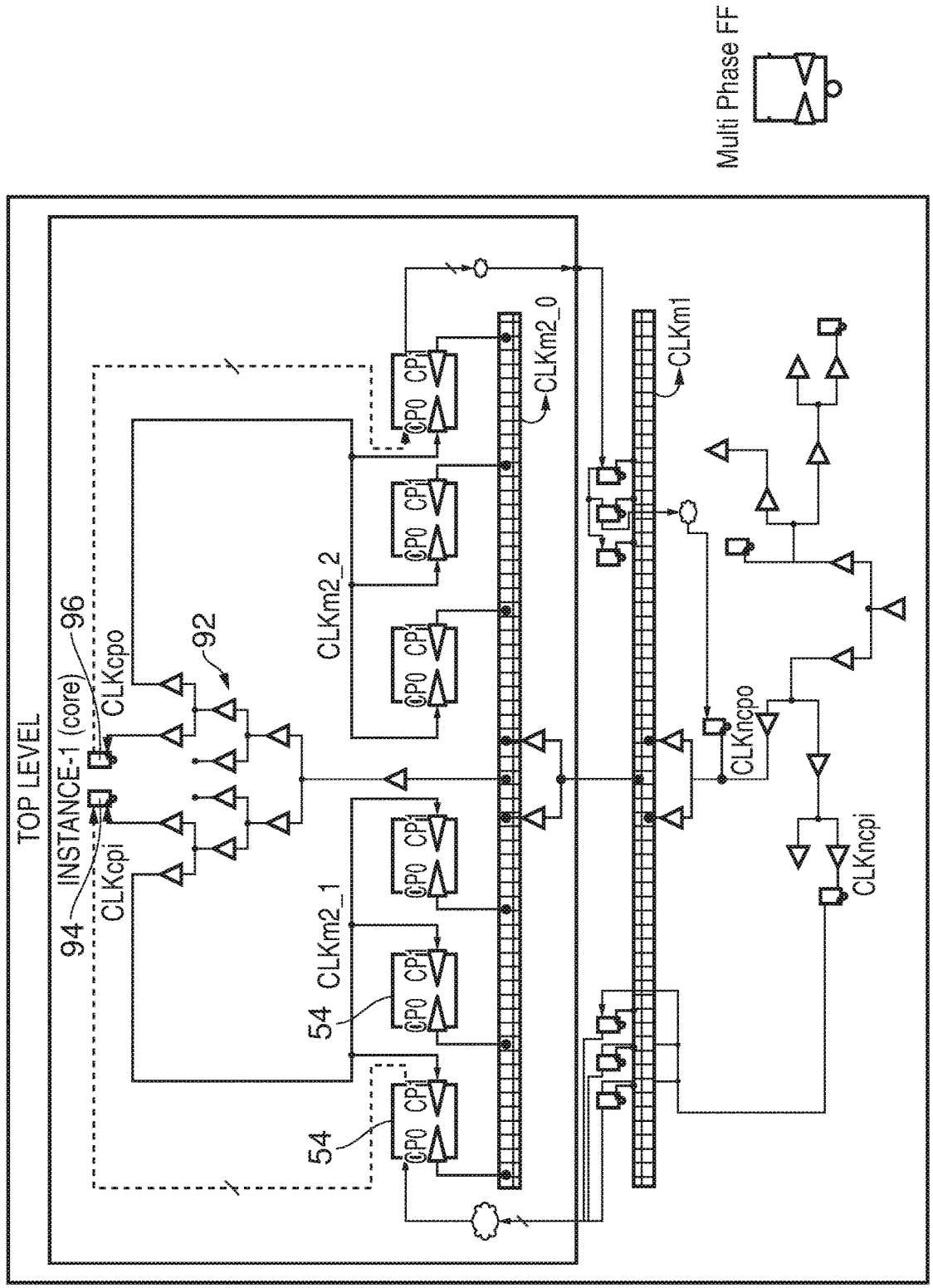
Figure 8:
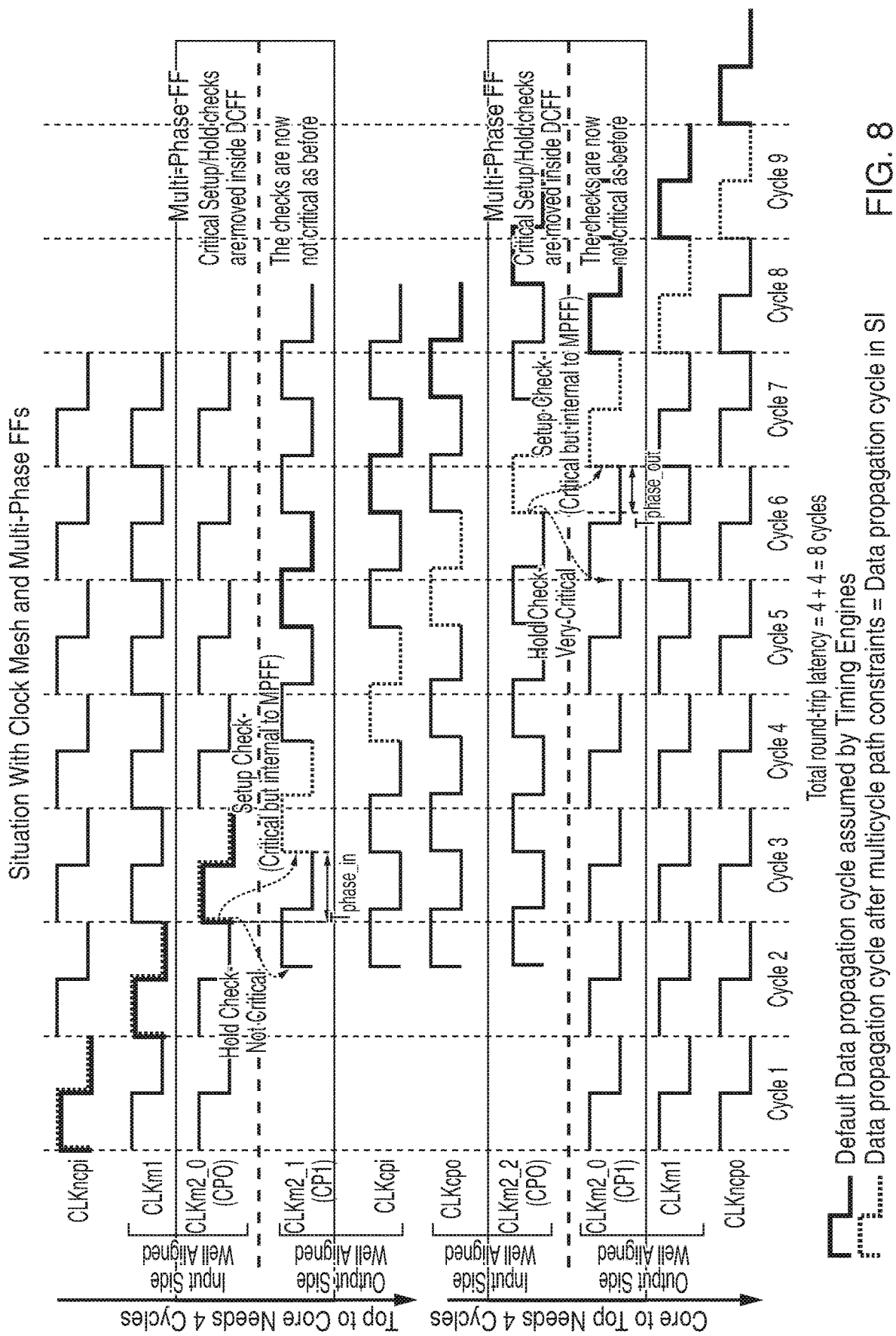
Figure 9:
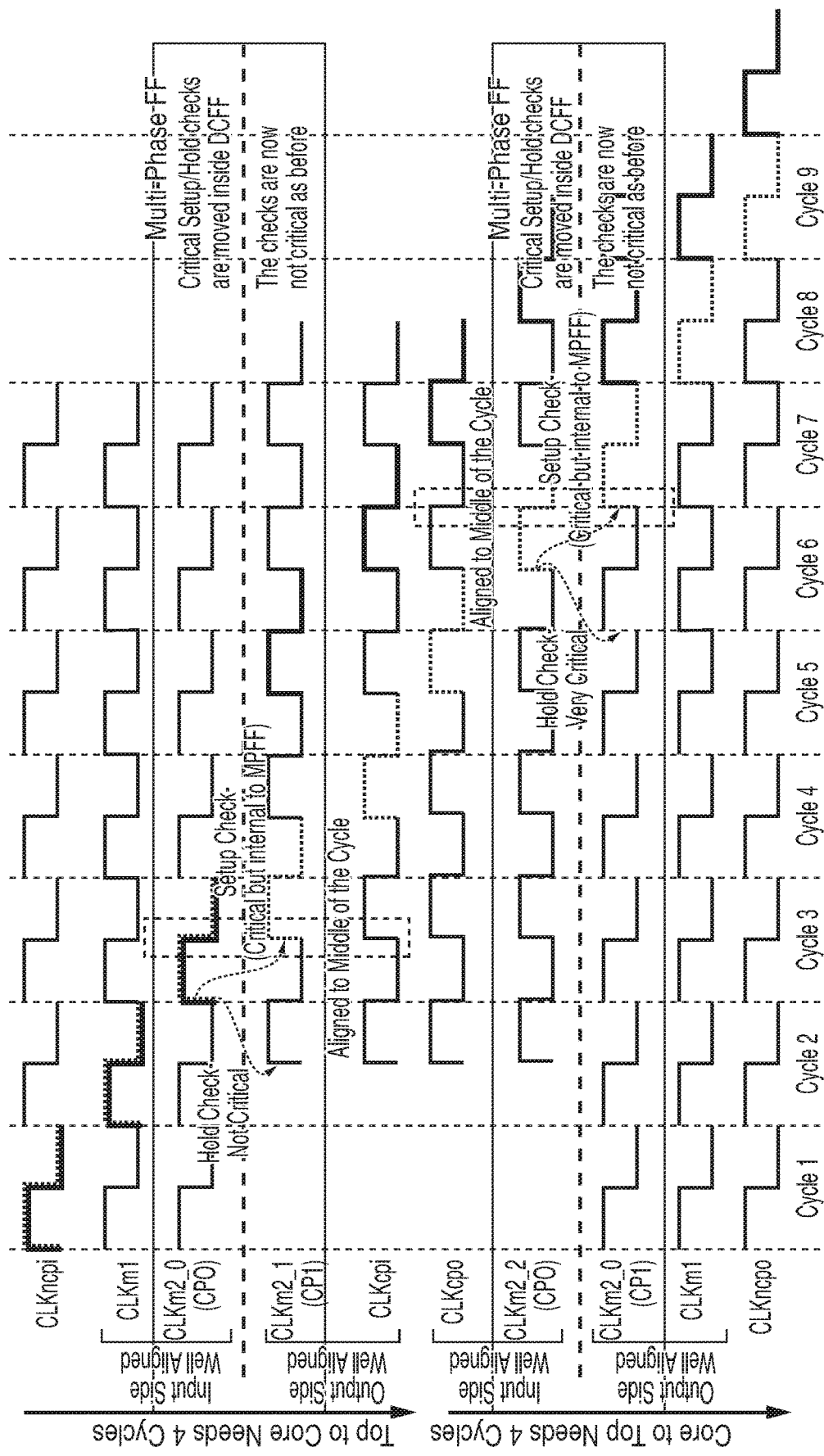
Figure 10:
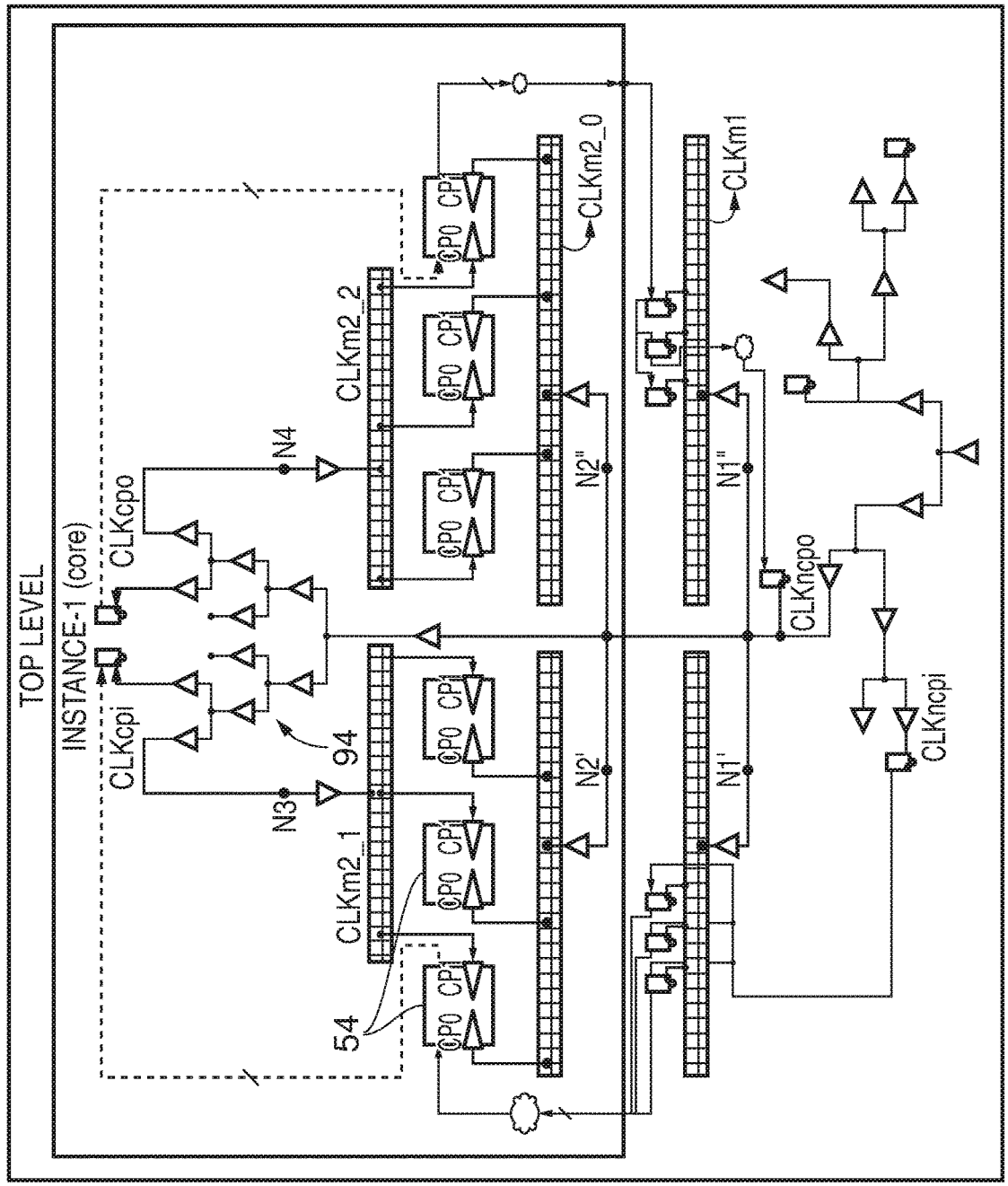
Figure 11:
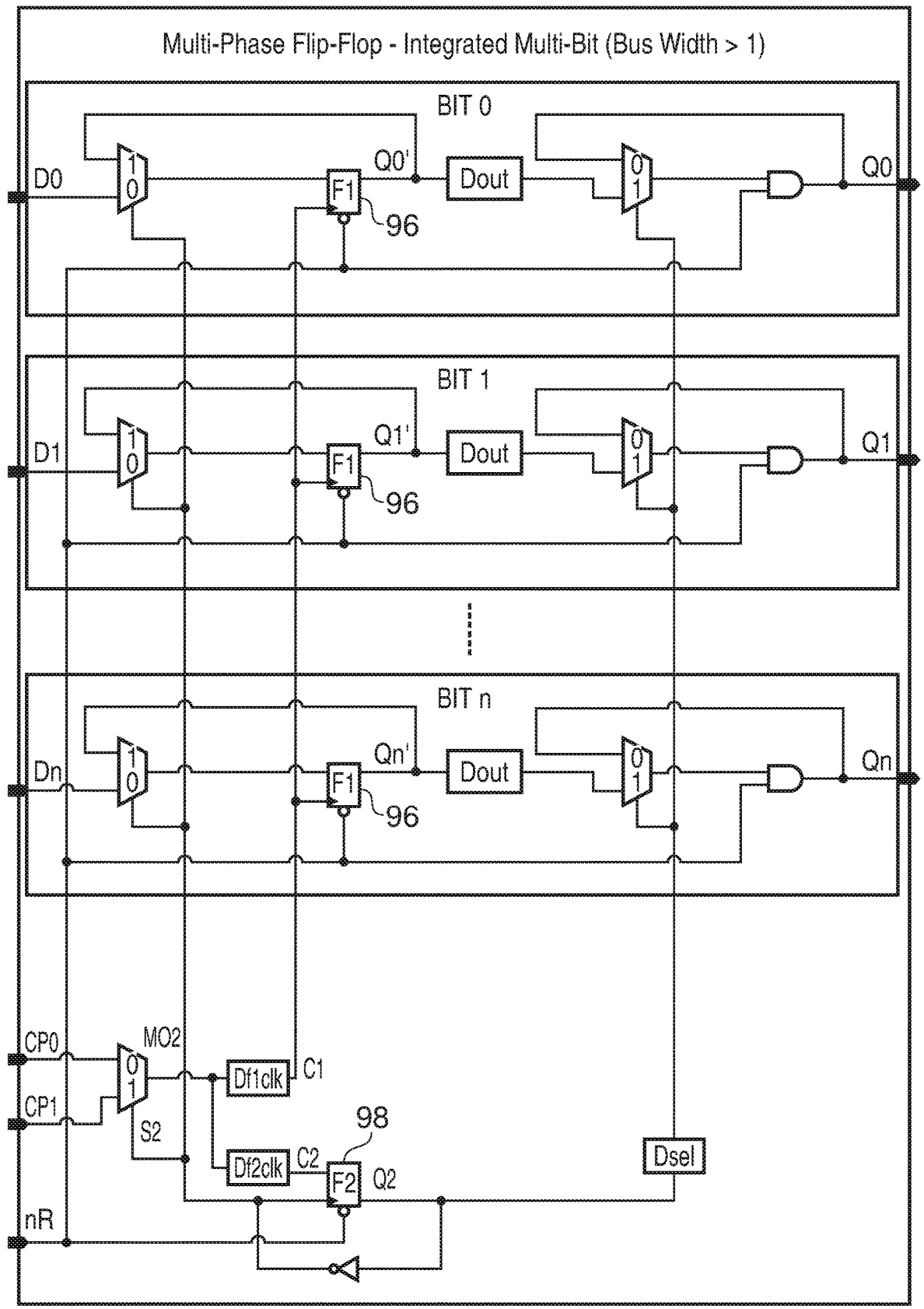
Figure 12:
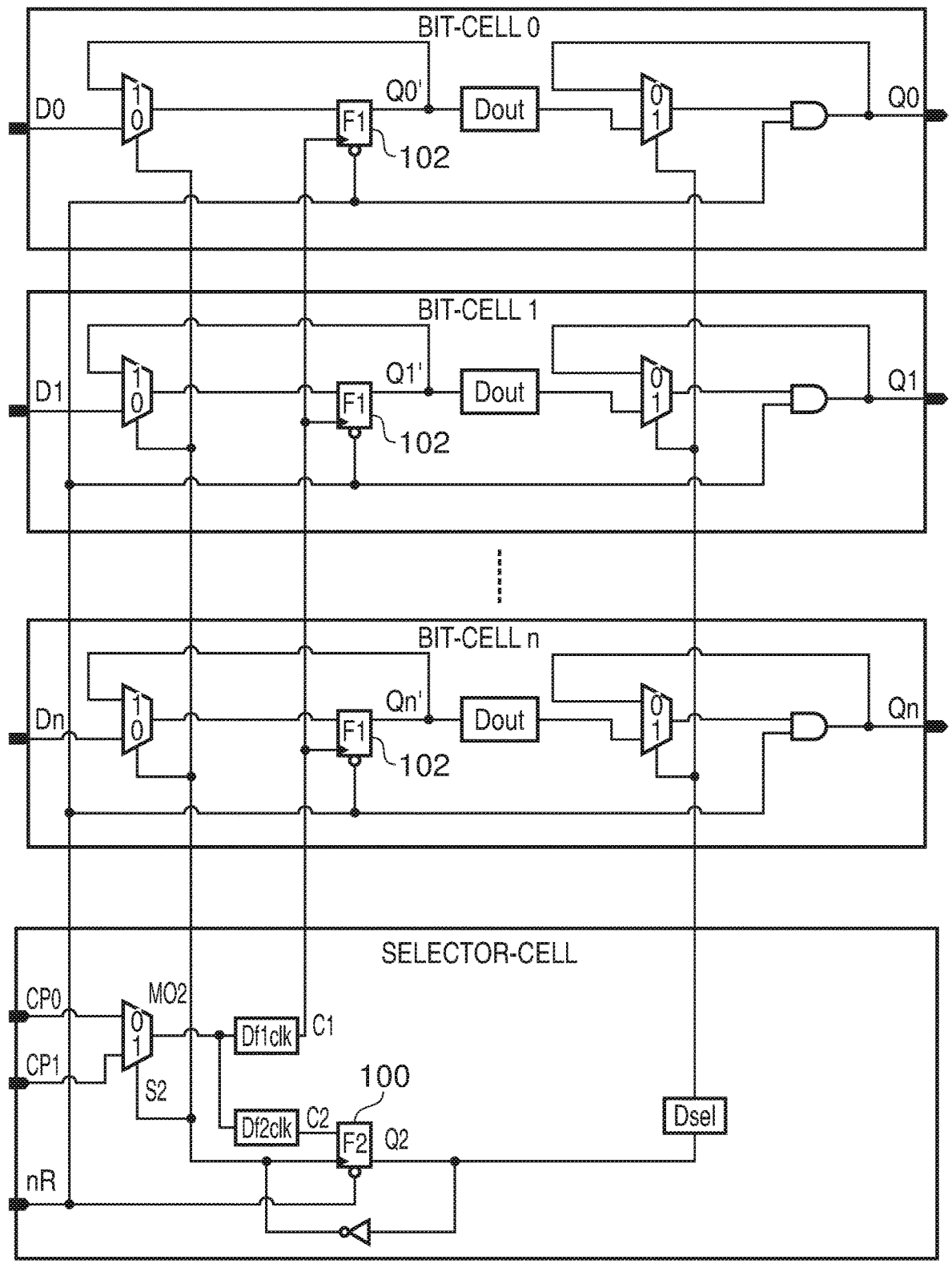
Figure 13:
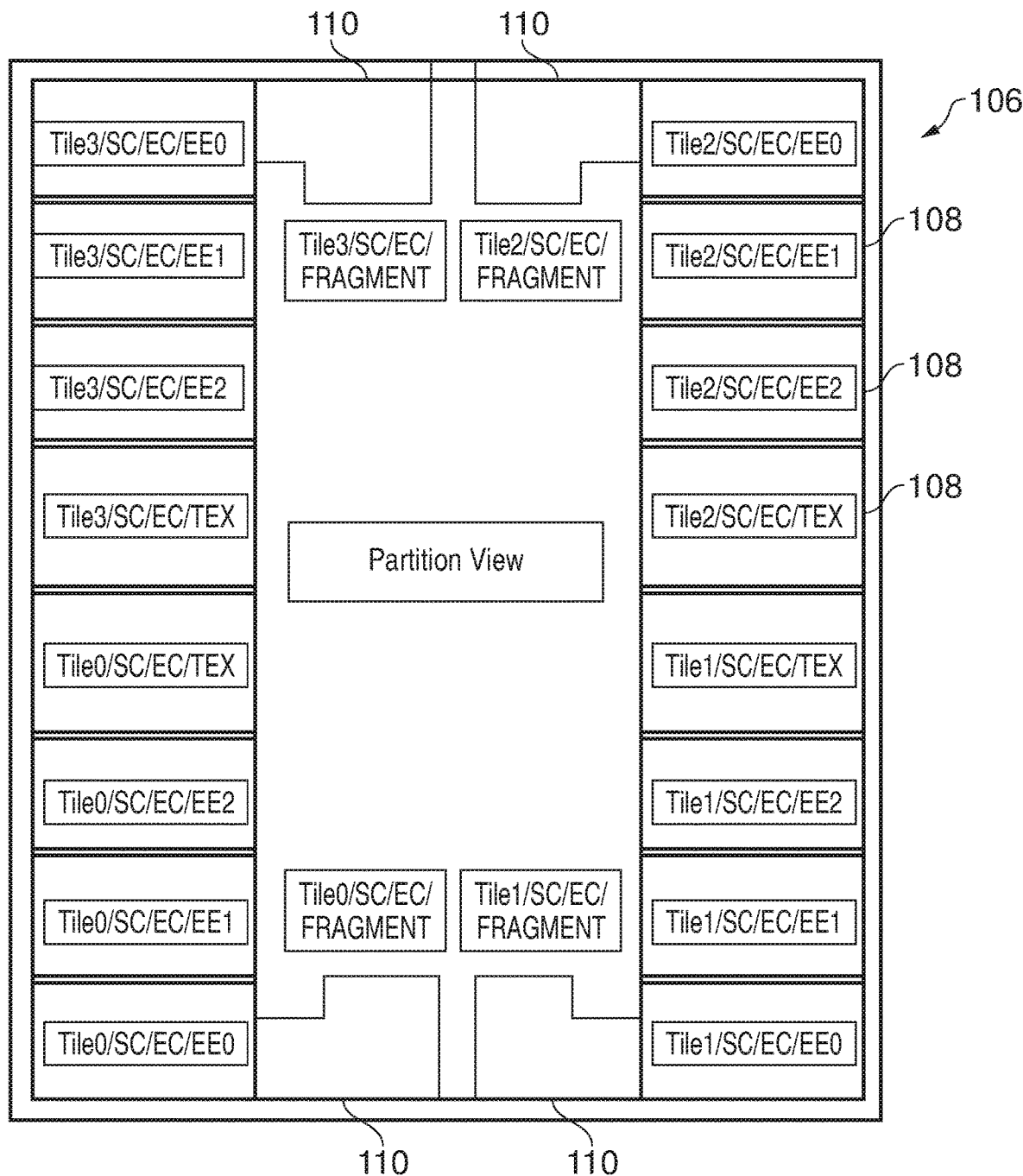

FIG. 4 schematically illustrates a further example embodiment including multiple processor cores connected via interconnect circuitry;

FIG. 5 schematically illustrates a signal value storage circuit responsive to two clock signals;

FIG. 6 is a signal diagram schematically illustrating the operation of the circuit of FIG. 5;

FIG. 7 schematically illustrates an integrated circuit incorporating the use of clock meshes on either side of an interface and signal value storage circuits responsive to two clock signals;

FIGS. 8 and 9 are signal diagrams schematically illustrating the operation of the circuitry of FIG. 7;

FIG. 10 illustrates a further example embodiment of an integrated circuit including clock meshes on either side of an interface and signal value storage circuits responsive to two clock signals;

FIG. 11 schematically illustrates an example embodiment in which selection value storage circuitry is shared between multiple data value storage circuits;

FIG. 12 schematically illustrates an example embodiment in which selection value storage circuitry is provided within a separate cell from multiple instances of cells containing data value storage circuitry; and FIG. 13 schematically illustrates an integrated circuit including multiple instances of a functional block circuitry to which a clock signal is to be distributed.

Figure 1A:
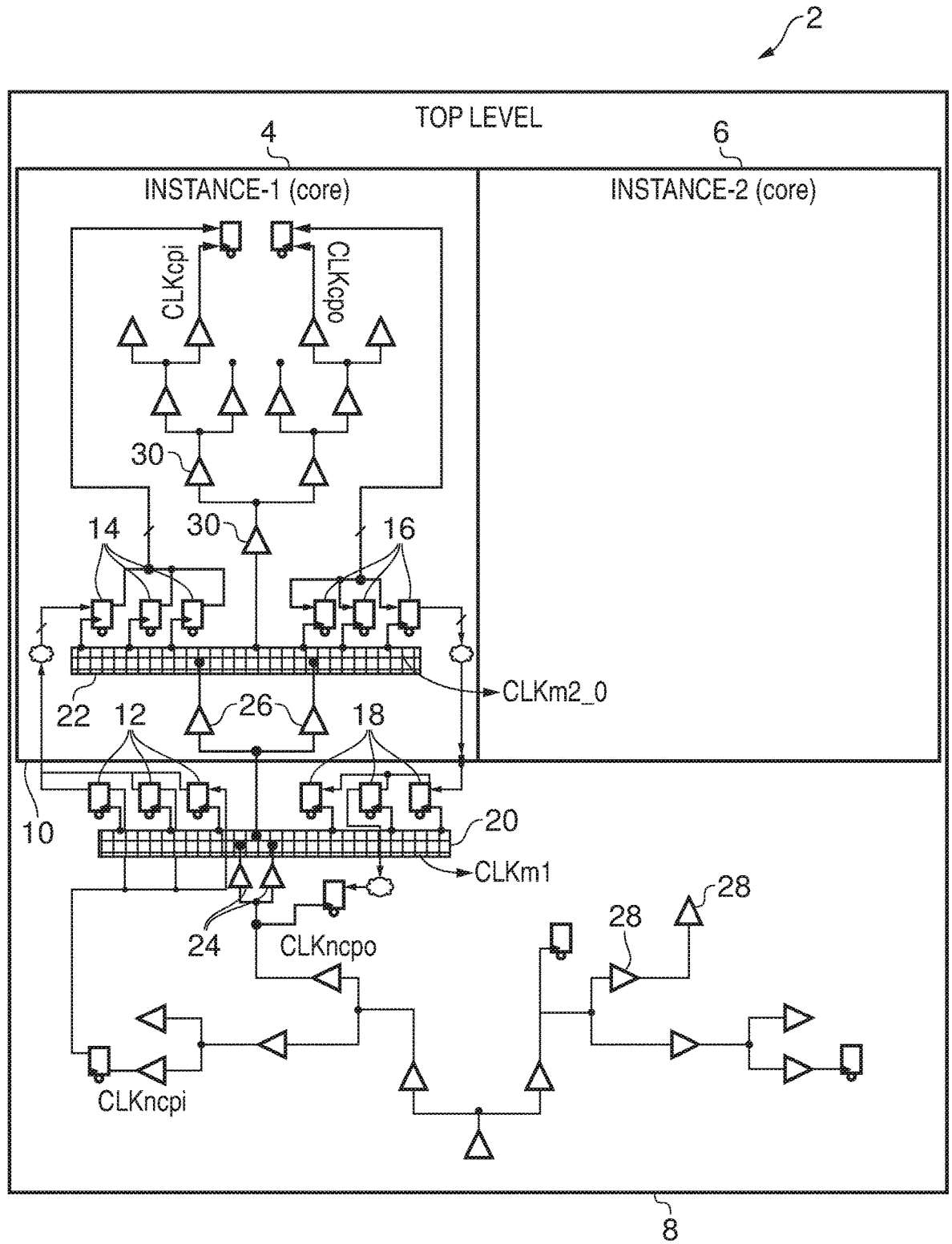

FIG. 1A schematically illustrates an integrated circuit 2 including multiple blocks of circuitry. These blocks of circuitry include in this example a first instance of a processor core 4, a second instance of a processor core 6 and interconnect circuitry 8. It will be appreciated that FIG. 1 illustrates one example embodiment of the present disclosure, and in practice the present techniques may be applied to blocks of circuitry of a wide variety of different forms. These blocks of circuitry could comprise, for example, general purpose processor cores, graphics processing units, cache memories at various levels within a memory hierarchy, main memory blocks, etc.

The different instances of the processor core 4, 6 illustrated in FIG. 1A each interface with the interconnect 8. The manufacture and operating conditions, as well as the other circuitry surrounding each instance of the processor core can influence the behaviour of the circuits responsible for distributing a clock signal to and within that instance. Accordingly, adjusting the common design of an instance of the processor core 4, 6 to suit the constraints in one location within the overall integrated circuit, may render that same design unsuitable for use at another location within the integrated circuit. Data signals may pass in either direction between the processor cores 4, 6 and the interconnect circuitry 8. Variations in manufacture and operating conditions can vary throughout the illustrated circuit 2 affecting both clock and data signals and making timing closure difficult.

As illustrated in FIG. 1A, the processor core 4 communicates via an interface 10 with the interconnect 8. In practice, the other instance of the processor core 6 will also communicate with the interconnect 8 in a similar manner, but this has been omitted from FIG. 1 for the sake of clarity. The signals to be passed from the interconnect 8 to the processor core 4 are held within flip-flops 12 (interface signal storage circuits) within the interconnect. When, for example, a rising clock signal edge is detected, the signal values stored within these flip-flops 12 are stored into corresponding flip-flops (interface signal storage circuits) 14 within the processor 4. Signals are passed in the opposite direction from the processor core 4 to the interconnect 8 using flip-flops 16 within the processor core 4 and corresponding flip-flops 18 within the interconnect 8.

Figure 1B:
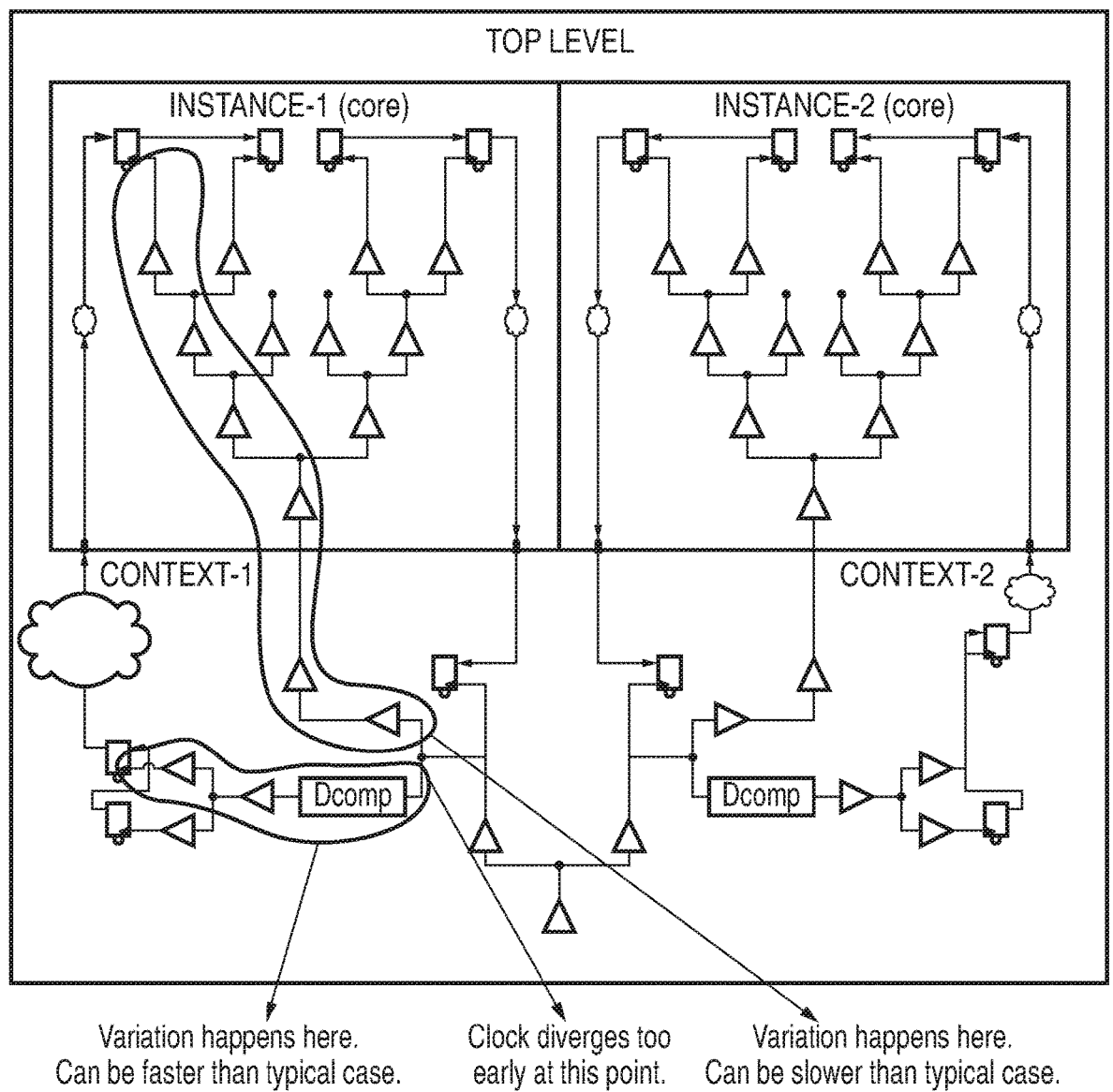

The flip-flops 12, 14, 16, 18 all capture a new data signal value in response to detecting a predetermined characteristic (such as an edge whereby the clock signal value changes although level switched latches and other forms of storage element may also be used) in the clock signal. In order to meet, setup and hold limitations of the flip-flop circuits 12, 14, 16, 18 it is important that there should not be too great a difference in characteristics of the clock signal controlling the flip-flops 12, 18 within the interconnect 8 and the clock signal controlling the flip-flops 14, 16 within the processor core 4. FIG. 1B illustrates how undesirable differences can arise in the clock signals of flip-flops inside and outside the processor core. When the clock diverges too early, the receiving flip-flop can have a considerably different clock tree delay from that of sending flip-flop. Consequently variation margins have to be applied to these different portions. This is illustrated in FIG. 1B. Using the clock mesh of FIG. 1A, there is no significant portion of the clock tree in the interconnect after a divergent point the clock mesh 20 is the divergent point.

As illustrated in FIG. 1A, a clock mesh 20 is provided within the interconnect 8 from which each of the flip-flops 12, 18 takes its clock signal. This clock mesh 20 serves as a lump-load and is driven by multiple clock drivers 24. The use of multiple clock drivers 24 helps ensure that the clock signal on the clock mesh 20 has a consistent level rather than being subject to transmission line effects. A single large driver could also be used.

The clock mesh 20 driving the clock signal to all of the flip-flops 12, 18 serves to reduce the risk that an individual clock driver 24 will be too strong or too weak resulting in a clock signal supplied to an individual flip-flop changing out of step with other flip-flops which are intended to operate in synchronism therewith.

As illustrated in FIG. 1A, the processor core 4 also includes a clock mesh 22 which is driven by clock drivers 26. The clock drivers 26 receive their clock signal input from the clock mesh 20. The signal propagation delays and performance of the clock drivers 24, 26 may be adjusted (e.g. using SPICE modelling) to ensure a low amount of phase difference between, for example, the rising edges in the clock signals CLKm1 and CLKm2_0 which are taken from the clock mesh 20 within the interconnect 8 and the clock mesh 22 on the other side of the interface 10 within the processor core 4.

As illustrated in FIG. 1A, the interconnect 8 includes a clock tree formed of buffers 28 which distribute a clock signal through the interconnect 8, including to the clock drivers 24. The clock signal from the clock mesh 22 within the processor core 4 is supplied to a clock tree comprising buffers 30 within the processor core 4. Signals from the processor core 4 may be supplied to the interconnect 8 subsequent to processing performed by the processor core 4. Accordingly, such signals will be subject to phase shifts that may arise as a consequence of the clock signal propagating through the multiple clock tree levels within the processor core 4. However, subsequent to capture of these signals by the flip-flops 16 within the processor core 4, these signals will be passed to the flip-flops 18 within the interconnect 8 using the clocks signals taken from the clock meshes 22, 20 which have little phase difference therebetween. In practice the clock drivers 24, 26 may be subject to SPICE modelling so as to control their parameters and ensure that the clock signals on the clock meshes 20, 22 are closely synchronised (clock edges occur at substantially the same time).

As previously discussed, the processor cores 4, 6 and the interconnect 8 are blocks of circuitry. As shown, the use of the clock mesh in association with the interface storage circuits (the flip-flops 12, 14, 16, 18) may be employed on both sides of the interface 10. It will be appreciated that the blocks of circuitry 4, 6, 8 could be designed and provided by different companies and sold as different designs to a customer. The use of the clock mesh 20, 22, the clock drivers 24, 26 and the interface storage circuits 12, 14, 16, 18 as described above may be only on one side of the interface 10, but desirable should be on both sides of that interface 10.

Figure 2:
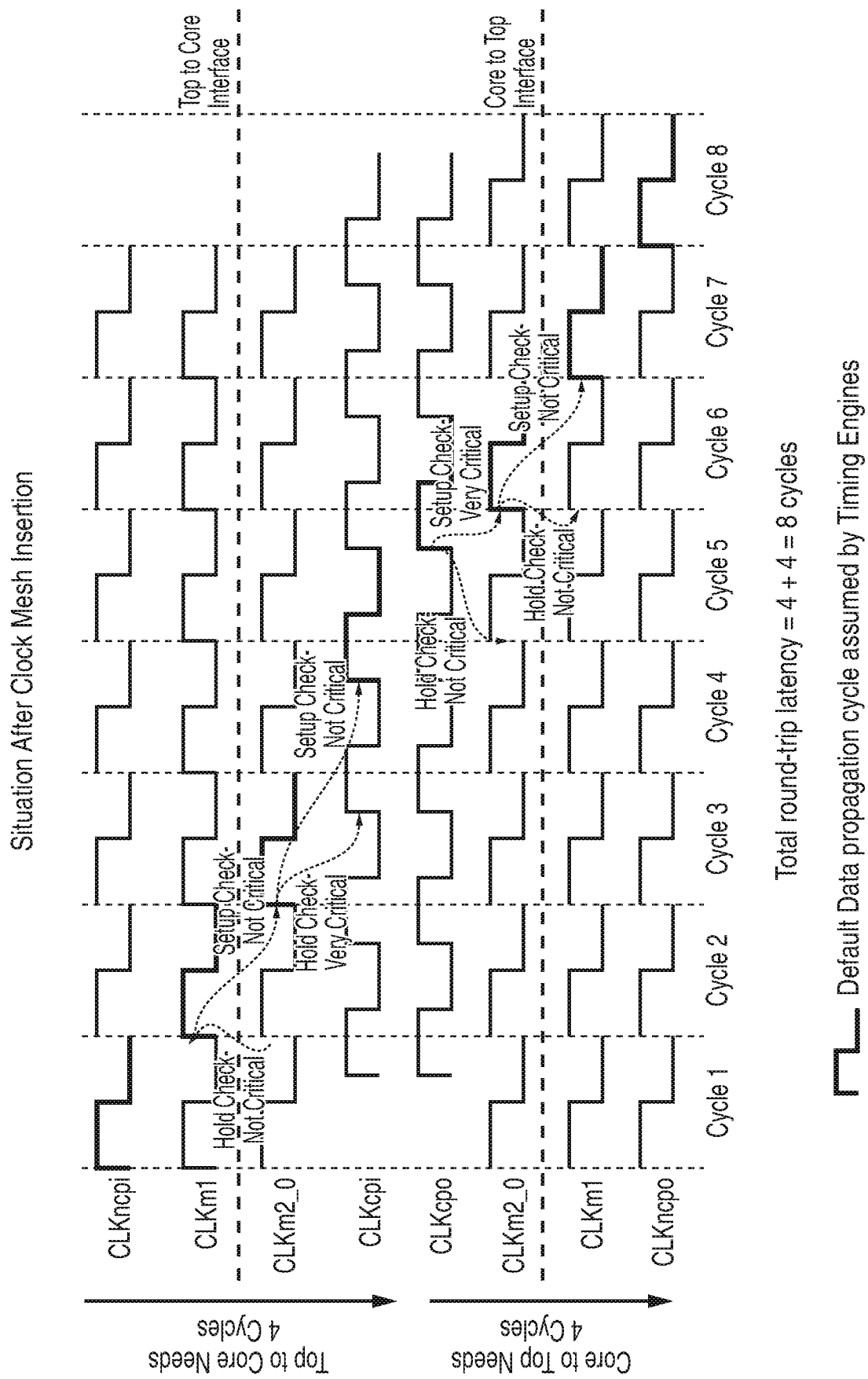
FIG. 2 is a signal diagram schematically illustrating the operation of a portion of the circuitry of FIG. 1.

FIG. 2 is a signal diagram schematically illustrating clock signals at various levels within the clock tree and the method of operation of the circuitry of FIG. 1. FIG. 2 shows that the interface timing has improved due to the use of the clock mesh(es). In some cases insertion of the clock mesh can introduce minor issues within the core, e.g. the phase difference between CLKm2_0 and CLKcpi/CLKcpo. These are shown in FIG. 2. As can be seen in FIG. 2, the clock signals on either side of the interface 10, namely clock signals CLKm1 and CLKm2_0 have little phase difference therebetween. The clock drivers 26 receive the clock signal CLKm1 from the clock mesh 20 and are formed so as to drive the clock signal CLKm2_0 on the clock mesh 22 such that there is little phase difference between these two clock signals. As shown within FIG. 2, within the remainder of the clock tree formed of the buffers 30 within the processor core 4, propagation delays and phase differences may result in clock signals at different levels within the clock tree network having significant phase differences therebetween. This can result in the hold constraints and setup constraints of various signal storage elements controlled by the clock signals at the different levels being difficult to meet.

Figure 3A:
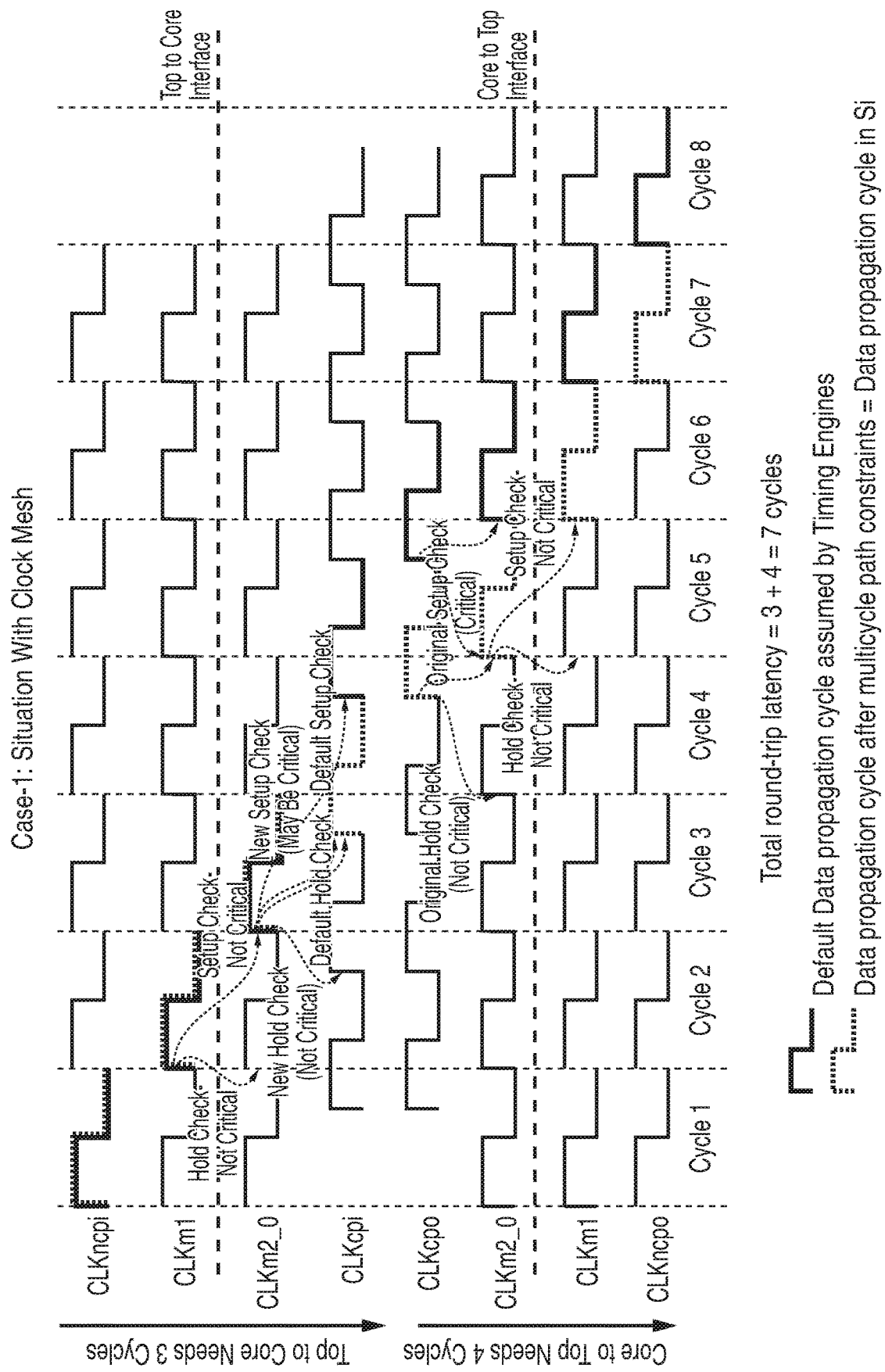
FIGS. 3A and 3B are signal diagrams schematically illustrating how problems which can arise as a consequence of clock signal propagation delay within a clock tree may be addressed by re-designating the clock signal edges.
Figure 3B:
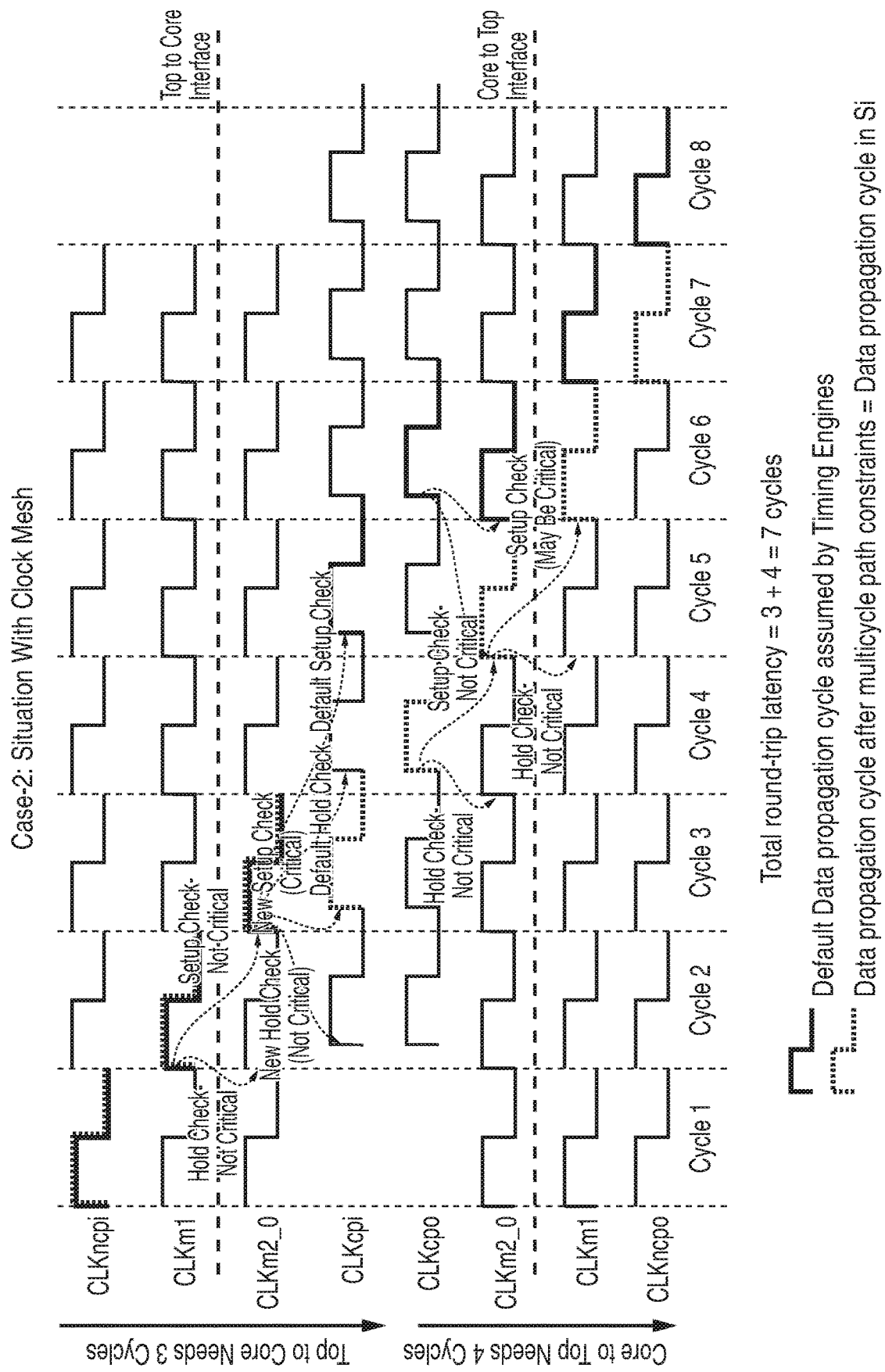

FIGS. 3A and 3B schematically illustrate how such setup and hold constraints may be addressed within the clock tree of the processor core 4 by re-designating, or slipping, the clock signal edges relative to one another in the manner in which they are deemed to control the associated signal storage circuitry.

FIG. 4 schematically illustrates another example embodiment. In this example embodiment, the interconnect 32 includes a clock mesh 34 for signals to be passed from the interface storage circuits 40 within the interconnect 32 to the interface storage circuits 42 within the processor core 4. The interconnect 32 also includes a separate clock mesh 38 for supplying a clock signal to the interface storage circuits 44 within the interconnect 32 that are to receive signals from the interface storage circuits 46 within the processor core 36.

Compared to the embodiment of FIG. 1, the example embodiment of FIG. 4 splits the clock mesh depending upon whether the signals being passed across the interface are outbound from or inbound to the interconnect circuitry 32. Within the processor core 36 itself, respective clock meshes 48, 50 may be used in a similar way to provide the clock signals for the interface storage circuits (flip-flops) 42 and 46 respectively. It is also possible that the clock mesh may be split into a larger number of divisions on each side of the interface. Furthermore, it would also be possible for the clock mesh to be split on one side of the interface and not split on the other side of the interface.

The schematic illustration of FIG. 4 shows a single clock driver 52 for driving each of the clock meshes 34, 38, 48, 50. In practice, it will be appreciated that in some embodiments, multiple drivers may be provided distributed along the respective clock mesh 34, 38, 48, 50. It would also be possible in some embodiments to use respective large drivers (transistor) that would individually be capable of driving the respective divided (and consequently physically smaller) clock mesh 34, 38, 48, 50 as a single lump load.

FIG. 5 schematically illustrates a signal value storage circuit 54. This signal value storage circuit has a signal input 56 to receive an input signal D, a signal output 58 to supply an output signal Q, a first clock signal input 60 to receive a first clock signal CP0 and a second clock signal input 62 to receive a second clock signal CP1, which is different from the first clock signal CP0 (e.g. the same frequency and waveform, but with a different phase). The signal value storage circuit 54 also has a reset signal input 64 to receive a reset signal nR.

Within the signal value storage circuit 52 there are provided data value storage circuitry 66 and selection value storage circuitry 68 in the form of flip-flops. A clock selecting multiplexer 70 is switched in dependence upon the selection value Q2 stored by the selection value storage circuitry 68 in order to select either the first clock signal CP0 or the second clock signal CP1 for supply to the clock input of the data value storage circuitry 66 and the selection value storage circuitry 68. In this example embodiment, the data value storage circuitry 66 and the selection value storage circuitry 68 responds to rising edges in the clocks signals supplied to them to capture a new signal value supplied to their signal (data) value input and then supply this captured signal value as an output.

The data value storage circuitry supplies an output Q1 representing a stored data value. The selection value storage circuitry 66 outputs a selection value Q2 controlling whether the signal value storage circuit 54 is in a first state responsive to detecting a predetermined characteristic (e.g. rising edge) of the first clock signal CP0 or a second state responsive to detecting a predetermined characteristic (e.g. rising edge) in the second clock signal CP1.

In the first state, the selection value storage circuitry 68 stores and outputs a selection value signal Q2 with a value of "1", which is inverted by an invertor 78 to form signal S1 such that the clock selecting multiplexer 70 selects the first clock signal CP0 to be supplied to the clock inputs of both the data value storage circuitry 66 and the selection value storage circuitry 68. This selection value signal S2 is supplied to an input selecting multiplexer 72 and as noninverted signal S3 to an output selecting multiplexer 74. The input selecting multiplexer 72 is controlled by the selection value in the first state to select the input signal D as supplied to the signal input 56. This selected signal input is supplied to the data input of the data value storage circuitry 66.

It will be noted that the inverter 78 has the action of inverting the signal value for the selection value Q2 as supplied to the clock selecting multiplexers 70 and the input selecting multiplexer 72 as compared to the selection value Q2 output from the selection value storage circuitry 68. Accordingly, in the first state the selection value supplied to an output multiplexer 74 is "1" and this serves to select a data value currently being output from the data value storage circuitry 66 to be supplied as the output signal Q.

When a rising edge in the first clock signal CP0 is detected by the selection value storage circuitry 68, this serves to change the selection value currently stored by the selection value storage circuitry 68 (e.g. by virtue of the action of the inverter 78). This switches the clock selecting multiplexers 70, the input selecting multiplexer 72 and the output selecting multiplexer 74. The response time of the selection value storage circuitry 68 in changing the selection value it is outputting, and accordingly the switching of the various multiplexers, is such that the rising edge in the first clock signal CP0 supplied to the data value storage circuitry 66 triggers the data value storage circuitry 66 to store the input signal D supplied to it via the input multiplexer 72 before the input multiplexer is switched into a feedback state. The new value stored within the data value storage circuitry 66 propagates through delay circuitry 78 (Dout) to reach the input of the output selecting multiplexer 74. However, the delay associated with the delay circuitry 78 is sufficient that the output selecting multiplexer 74 has switched as a consequence of the rising edge in the first clock signal CP1 to select the fed back output signal Q for recirculation as the output signal, via AND gate 76 (provided to assist reset of the signal value storage circuitry 54), prior to the new data value from the data value storage circuitry reaching the output selecting multiplexer 74. In this regard, the delay associated in the selection value propagating from the selection value storage circuitry via selection delay circuitry (Dsel) 80 to the output selecting multiplexer 74 is less than the delay associated with the new stored data value propagated from the data value storage circuitry 66 to the output multiplexer 74. Thus, the action of the signal value storage circuitry 54 upon detecting the rising edge of the first clock signal CP0 is to capture and store an updated input signal value D into the data value storage circuitry 66, whilst continuing to output the previously stored data value at the signal output 58.

Upon detection of the rising edge of the first clock signal CP0, the signal value storage circuitry 54 is switched into the second state in which it is responsive to a predetermined characteristic (e.g. rising edge) in the second clock signal CP1. During this second state it is the second clock signal CP1 which is selected by the clock selecting multiplexer 70 and supplied to the clock inputs of the data value storage circuitry 66 and the selection value storage circuitry 68. When a rising edge in the second clock signal CP1 is detected, the input selecting multiplexer 72 is feeding back the currently stored data value to the input of the data value storage circuitry from which a new data value is captured and accordingly the data value stored within the data value storage circuitry 66 is unaltered. The rising edge of the second clock signal CP1 supplied to the selection value storage circuitry 78 triggers it to invert the value of the selection value by the action of the inverter 78. This inverted selection value is supplied to the output selecting multiplexer 74 and controls it to now select the data value stored within the data value storage circuitry 66 to be output from the signal output 58. Thus, the signal value captured upon the rising edge of the first clock signal is launched out from the signal output 58 upon detection of the rising edge of the second clock signal.

The finite delay in the change of the selection value reaching the input selecting multiplexer 72 and changing its selection has the result that any new value of the input signal D does not reach the data value storage circuitry 66 via the input selecting multiplexer 72 until after the rising edge in the second clock signal CP1 has already passed and accordingly a new data value is not stored into the data value storage circuitry 66 as a consequence of the rising edge in the second clock signal CP0. The selection value storage circuitry 68 inverts the stored selection value when a rising clock edge is received at its clock input. As the inversion of the selection value and the corresponding change in clock selection does not take place until after the rising edge has reached the selection value storage circuitry 68, the selection value storage circuitry serves to alternate between a state in which it is primed to detect a rising edge in the first clock signal and a state in which it is primed to detect a rising edge in the second clock signal. When a rising edge in the first clock signal is detected, then an input signal D is captured into the data value storage circuitry 68. This newly captured data value is not immediately supplied as the output signal at the signal output 58 by virtue of the action of the output selection multiplier 74 being switched to feedback operation before the newly captured data value can reach the output selecting multiplexer 74 via the delay circuitry 78. Once in the second state and primed to detect a rising edge in the second clock signal CP1, the signal value storage circuitry 54 responds to a detected rising edge in the second clock signal CP1 by switching the selection value and accordingly switching the selection made by the output selecting multiplexer 74 such that the previously captured data value stored within the data value storage circuitry 66 is then launched as the output signal value from the signal output 58. Detection of the rising edge and the second clock signal CP1 returns the signal value storage circuitry 54 to the first state in which it is primed to detect the rising edge in the first clock signal value.

FIG. 6 is a signal diagram schematically illustrating in the method of operation of the circuitry of FIG. 5. A rising edge in the first clock signal CP0 at step 82 triggers capture of the input signal D at step 84. Furthermore, the rising edge of the first clock signal CP0 at step 82 triggers an inversion of the selection value corresponding to the signals S1 and S2 supplied as selecting inputs to the input selecting multiplexer 72 and the clock selecting multiplexer 70 as shown at step 86. The rising edge of the first clock signal CP0 at step 82 also triggers a change in the selection signal supplied to the output selecting multiplexer 74. The selection signal delay circuitry 80 however serves to phase shift this change in the selection made by the output selecting multiplexer 74 until after the changes in the selection signals S1 and S2 supplied to the clock selecting multiplexer 70 and the input selecting multiplexer 72. When a rising edge in the second clock signal CP1 is detected at step 88, then this triggers a change in the selection value supplied to the output selecting multiplexer 74 which permits the data value stored within the data value storing circuitry 66 to be passed to the signal output 58 at step 90.

FIG. 7 schematically illustrates the use of the signal value storage circuitry 54 as shown in FIG. 5 in combination with the clock meshes previously described in association with FIGS. 1 to 4. In particular, the signal value storage circuitry 54 is used to regain synchronism between signal values emerging after control by a clock signal that has propagated through the clock tree 92 back and signal values passed under control of the clock signal at the interface CLKm2_0. The signal value storage circuitry 54 receiving input signal values across the interface in synchronism with the clock signal CLKm2_0 may serve to launch these in synchronism with the clock signal CLKm2_1 received from further along the clock tree 92. Thus, such signals may be stored into a flip-flop 94 more reliably and with less criticality in relation to hold and setup requirements. In a similar way, a signal output from a flip-flop 96 controlled by the clock signal CLKcpo at a higher level within the clock tree 92 may be captured into the signal value storage circuitry 54 in synchronism with the clock signal CLKcpo and then launched out to the other block of circuitry on the other side of the interface in synchronism with the interface clock signal CLKm2_0.

FIGS. 3A and 3B illustrate how the problem(s) illustrated in FIG. 2 may be addressed by re-designating clock edges. The signal value storage circuitry 54 of FIG. 5 provides another way (sometimes better) to address these problems.

FIGS. 8 and 9 schematically illustrate the operation of the circuitry of FIG. 7 utilising a combination of the clock meshes at the interface and the signal value storage circuitry of FIG. 5. In FIG. 8 there is no phase shift between the interface clock signal CLKm2_0 and the clock signals controlling the signal value storage circuitry 54. In the case of FIG. 9 there is a phase shift of half a cycle between these signals.

FIG. 10 schematically illustrates a further example embodiment. In this example embodiment, multiple clock meshes are provided on either side of the interface between the blocks of circuitry. The signal value storage circuits 54 responsive to first and second clock signals as previously described are used to help realign the signal value and clock transitions subsequent to propagation delays within the clock tree 94 that have incurred phase shifts in the clock signals and subsequent data values.

FIG. 11 illustrates a further example embodiment. In this example embodiment, a plurality of data value storage circuitry 96 similar to that illustrated in FIG. 5 are provided and controlled in cooperation with shared selection value storage circuitry 98. In this example, each instance of the data value storage circuitry 96 serves to pass one bit value within a multi-bit value. These bit values are passed under control of the first and second clock signals CP0 and CP1. Sharing the selection value storage circuitry 98 between multiple instances of the data value storage circuitry 96 reduces circuit overhead.

FIG. 12 is a further example embodiment similar to that of FIG. 11 except that the selection value storage circuitry 100 is provided in a separate selector cell which serves to control multiple instances of data value storage circuitry 102 provided within the respective bit cells. These cells may be part of a design library. The sharing of a selector cell between multiple bit cells reduces circuit overhead.

FIG. 13 schematically illustrates an integrated circuit 106 including multiple instances of a block of circuitry 108, multiple instances of a block of circuitry 110 and multiple instances of a block of circuitry 112. These blocks of circuitry use the same design within each type of block of circuitry 108, 110, 112, e.g. the instances of block 108 are the same, the instances of block 110 are the same and the instances of block 112 are the same. However, the different placements of these blocks within the integrated circuit 106, together with manufacturing and other variations, has an effect upon the detailed timing of clocks signals within these different instances of the blocks of circuitry. The blocks of circuitry exchange signals via interfaces, but different instances of the block may behave differently. Adjusting the design of a block such that it operates in one location may render it inoperable in another location. The use of the present techniques helps address this problem by aligning the clock signals at the interfaces and aligning the clock signals subsequent to use of clock trees of significant depths within the blocks.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

The invention claimed is:

1. An integrated circuit comprising:
a block of circuitry; and
a further block of circuitry;
said block of circuitry comprising:
    a clock mesh to distribute a clock signal communicated with said further block of circuitry;
    one or more clock drivers to drive said clock mesh with said clock signal; and
    a plurality of interface storage circuits to store respective interface signals communicated with said further block of circuitry; wherein
    said plurality of interface storage circuits are coupled to said clock mesh to receive said clock signal from said clock mesh to control storage of said respective interface signals by said plurality of interface storage circuits using said clock signal; and
said further block of circuitry comprising:
    a further clock mesh to distribute said clock signal communicated with said block of circuitry;
    one or more further clock drivers to drive said further clock mesh with said clock signal; and
    a plurality of further interface storage circuits to store said respective interface signals communicated with said block of circuitry; wherein
    said plurality of further interface storage circuits are coupled to said further clock mesh to receive said clock signal from said further clock mesh to control storage of said respective interface signals by said plurality of further interface storage circuits using said clock signal;
wherein at least one of said interface signals is received by said further block of circuitry from said block of circuitry; and
wherein said clock signal is received by said further block of circuitry from said block of circuitry.

2. An integrated circuit as claimed in claim 1, comprising a plurality of instances of said block of circuitry and coupled to said further block of circuitry.

3. An integrated circuit as claimed in claim 1, wherein at least one of said interface signals is received by said block of circuitry from said further block of circuitry.

4. An integrated circuit as claimed in claim 1, wherein said clock mesh is driven as a lump load by said plurality of clock drivers.

5. An integrated circuit as claimed in claim 4, comprising a clock signal tree network to distribute said clock signal within said block of circuitry and to supply said clock signal to said clock mesh.

6. An integrated circuit according to claim 5, comprising one or more a signal value storage circuit within said clock signal tree network, said one or more signal value storage circuits each comprising:
a signal input to receive an input signal;
a signal output to supply an output signal;
a first clock signal input to receive a first clock signal;
a second clock signal input to receive a second clock signal different from said first clock signal;
processing circuitry to capture and to store a stored data value dependent upon said input signal in response to detecting a predetermined characteristic of said first clock signal and to generate said output signal dependent upon said stored data value in response to detecting a predetermined characteristic of said second clock signal; wherein
said processing circuitry comprises:
data value storage circuitry to store said stored data value; and
selection value storage circuitry to store a selection value to control said processing circuitry to switch between a first state responsive to said predetermined state in said first clock signal and a second state responsive to said predetermined state in said second clock signal.

7. An integrated circuit as claimed in claim 6, wherein said processing circuitry comprises a clock selecting multiplexer switched in dependence upon said selection value to select one of said first clock signal and said second clock signal to control value capture by said data value storage circuitry and said selection value storage circuitry.

8. An integrated circuit as claimed in claim 6, wherein said processing circuitry comprises an input selecting multiplexer switched in dependence upon said selection value to select one of said input signal and input feedback signal dependent upon said stored data value for capture by said data value storage circuitry.

9. An integrated circuit as claimed in any claim 6, wherein said processing circuitry comprises an output selecting multiplexer switched in dependence upon said selection value to select one of an output feedback signal dependent upon said output signal and said stored data value as said output signal.

10. An integrated circuit as claimed in claim 6, wherein said predetermined characteristic of said first clock signal is a predetermined change in value of said first clock signal.

11. An integrated circuit as claimed in claim 6, wherein said predetermined characteristic of said second clock signal is a predetermined change in value of said second clock signal.

12. An integrated circuit as claimed in claim 6, comprising a plurality of signal value storage circuits, where each of the plurality of signal value storage circuits comprises:
a signal input to receive an input signal;
a signal output to supply an output signal;
a first clock signal input to receive a first clock signal;
a second clock signal input to receive a second clock signal different from said first clock signal;
processing circuitry to capture and to store a stored data value dependent upon said input signal in response to detecting a predetermined characteristic of said first clock signal and to generate said output signal dependent upon said stored data value in response to detecting a predetermined characteristic of said second clock signal; wherein
said processing circuitry comprises:
data value storage circuitry to store said stored data value; and
selection value storage circuitry to store a selection value to control said processing circuitry to switch between a first state responsive to said predetermined state in said first clock signal and a second state responsive to said predetermined state in said second clock signal, wherein said selection value storage circuitry is shared between said plurality of signal value storage circuits.

13. A method of operating an integrated circuit having a block of circuitry and a further block of circuitry, said method comprising:
at said block of circuitry:
(i) distributing with a clock mesh a clock signal communicated with said further block of circuitry;
(ii) driving with one or more clock drivers said clock mesh with said clock signal; and
(iii) storing with a plurality of interface storage circuits respective interface signals communicated with said further block of circuitry;
wherein said plurality of interface storage circuits are coupled to said clock mesh to receive said clock signal from said clock mesh to control storage of said respective interface signals by said plurality of interface storage circuits using said clock signal; and
at said further block of circuitry:
(i) receiving said clock signal from said block of circuitry;
(ii) distributing with a further clock mesh a clock signal communicated with said block of circuitry;
(iii) driving with one or more further clock drivers said further clock mesh with said clock signal;
(iv) receiving at least one of said interface signals from said block of circuitry; and
(v) storing with a plurality of further interface storage circuits respective interface signals communicated with said block of circuitry;
wherein said plurality of further interface storage circuits are coupled to said further clock mesh to receive said clock signal from said further clock mesh to control storage of said respective interface signals by said plurality of further interface storage circuits using said clock signal.

* * * * *